United States Patent [19]

Roe et al.

[11] 4,017,579

[45] Apr. 12, 1977

[54] METHOD FOR FORMING A SHEATHED ELECTRICAL CABLE

[75] Inventors: Norman P. Roe; Gordon W. Brown, both of Idyllwild, Calif.

[73] Assignee: Consolidated Products Corporation, Idyllwild, Calif.

[22] Filed: Nov. 18, 1974

[21] Appl. No.: 524,643

[52] U.S. Cl. .............................. 264/174; 174/103; 174/107
[51] Int. Cl.² ...................... B29F 3/10; H01B 7/18
[58] Field of Search .............. 264/174; 174/102 R, 174/107, 103, 113 C, 131 R, 113 AS

[56] References Cited

UNITED STATES PATENTS

| | | | |
|---|---|---|---|
| 1,705,913 | 3/1929 | Gilbert | 174/107 |
| 2,041,269 | 5/1936 | Smith et al. | 174/107 |
| 2,589,507 | 3/1952 | Noyes | 174/131 A |
| 2,754,351 | 7/1956 | Horn | 174/107 |
| 2,870,311 | 1/1959 | Greenfield et al. | 174/115 |
| 3,259,684 | 7/1966 | Wakefield | 174/107 |
| 3,261,907 | 7/1966 | Morrison | 174/115 |
| 3,415,919 | 12/1968 | Kippan | 264/174 |
| 3,470,051 | 9/1969 | Mezer | 264/174 |
| 3,540,203 | 11/1970 | Thovesen et al. | 264/174 |
| 3,584,139 | 6/1971 | Swanson | 174/103 |
| 3,605,398 | 9/1971 | Carlson et al. | 174/107 |
| 3,784,732 | 1/1974 | Whitfill | 264/103 |
| 3,800,019 | 3/1974 | Parsey et al. | 264/174 |
| 3,879,518 | 4/1975 | Ney et al. | 264/174 |

Primary Examiner—Jay H. Woo

[57] ABSTRACT

A sheathed electromechanical cable comprises an insulated core and a plurality of strain members in the form of wires or fibers of high tensile strength, sandwiched between the sheath and the core. The sheath is made of a formable material of high tensile strength and which, in combination with the strain members, directly resists tensile and flexion stresses on the cable. The strain members are supplied to the core along a predetermined, converging path and are disposed in uniformly spaced, annular relation relative to the core and brought into snug engagement therewith by drawing through a die, the latter being associated with an extruder device for applying the sheath material around the exposed surface of the strain members. The extrusion period is short and is followed by a quench. The insulated core is composed of a single or a plurality of discrete conductors, with or without individual insulation, and surrounded by a dielectric. In an alternate form of the invention, the strain members constitute the cable core and a jacket of insulating material is extruded about the core. Subsequently, at least one electrical conductor is disposed exteriorly of the jacketed core and which conductor, in turn, may be covered with a wrapping or the like, to maintain the conductor in place on the cable.

7 Claims, 18 Drawing Figures

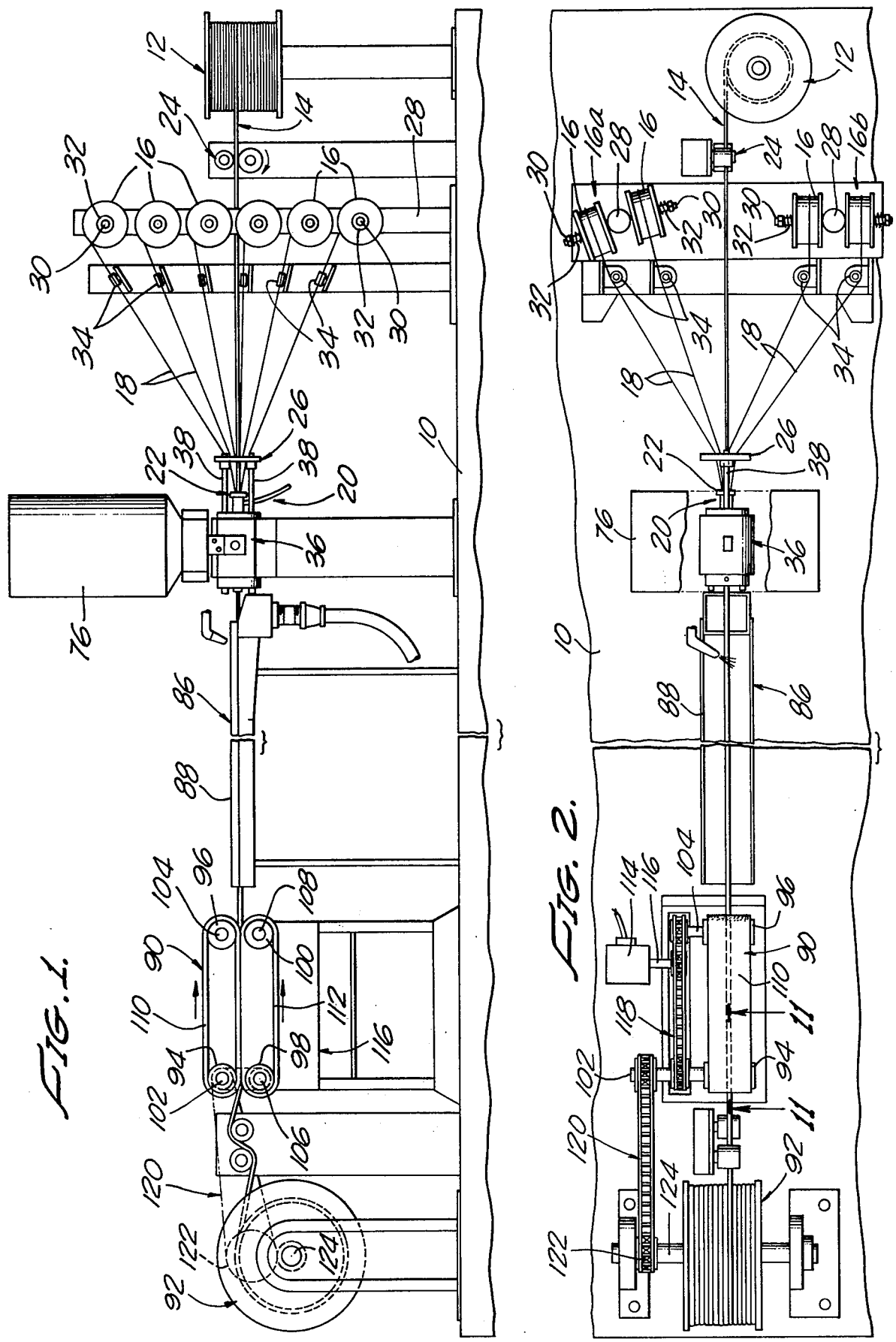

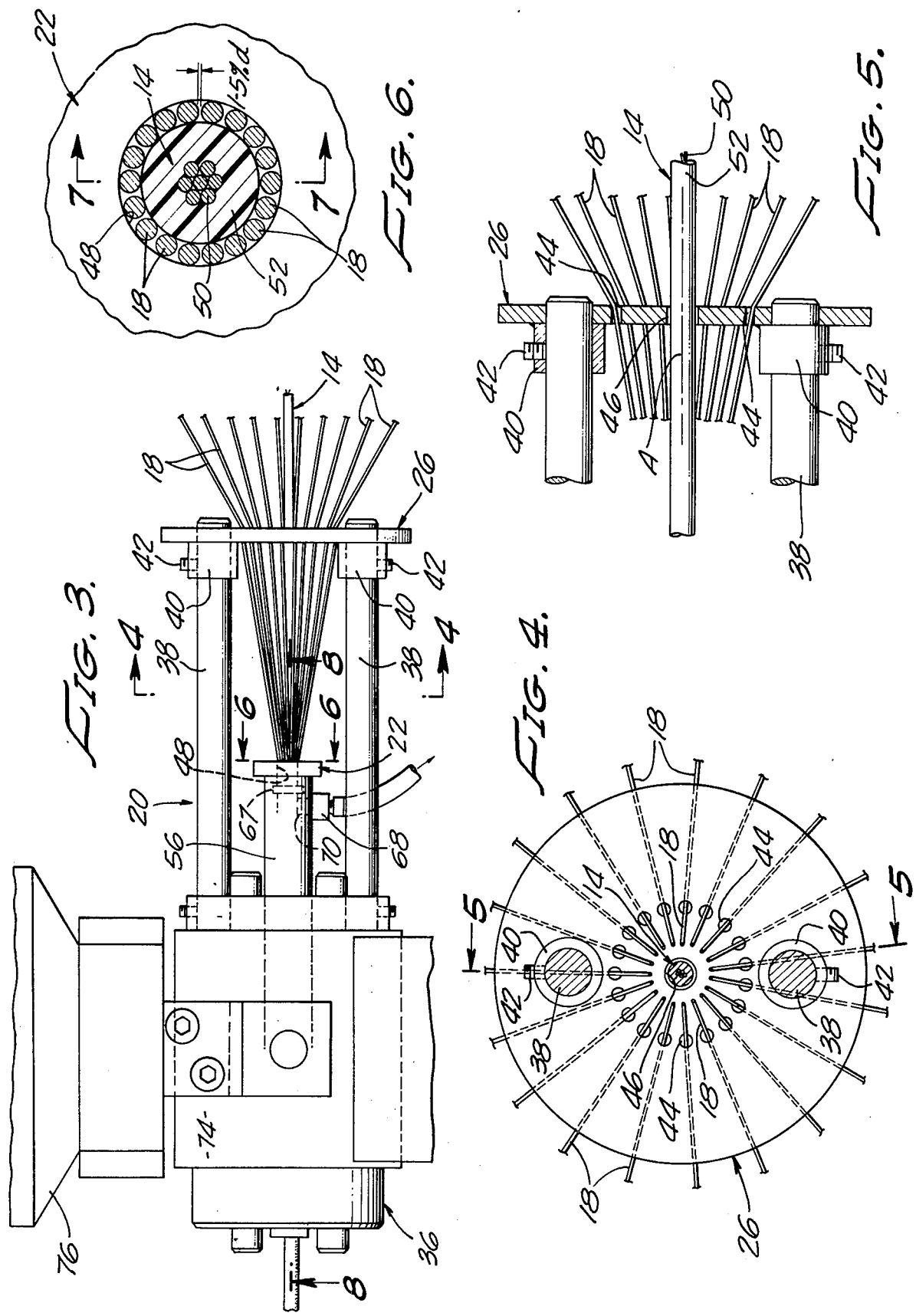

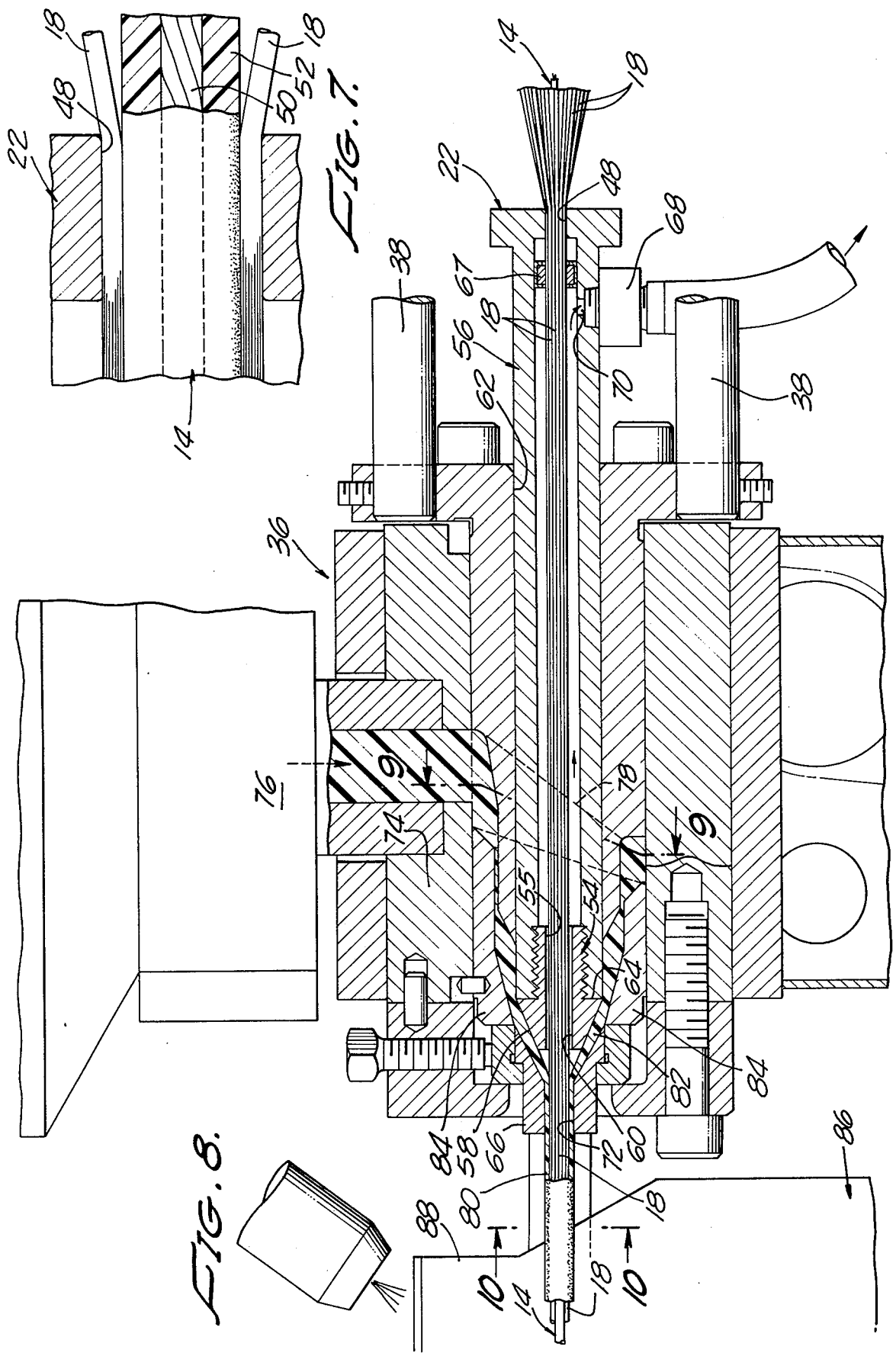

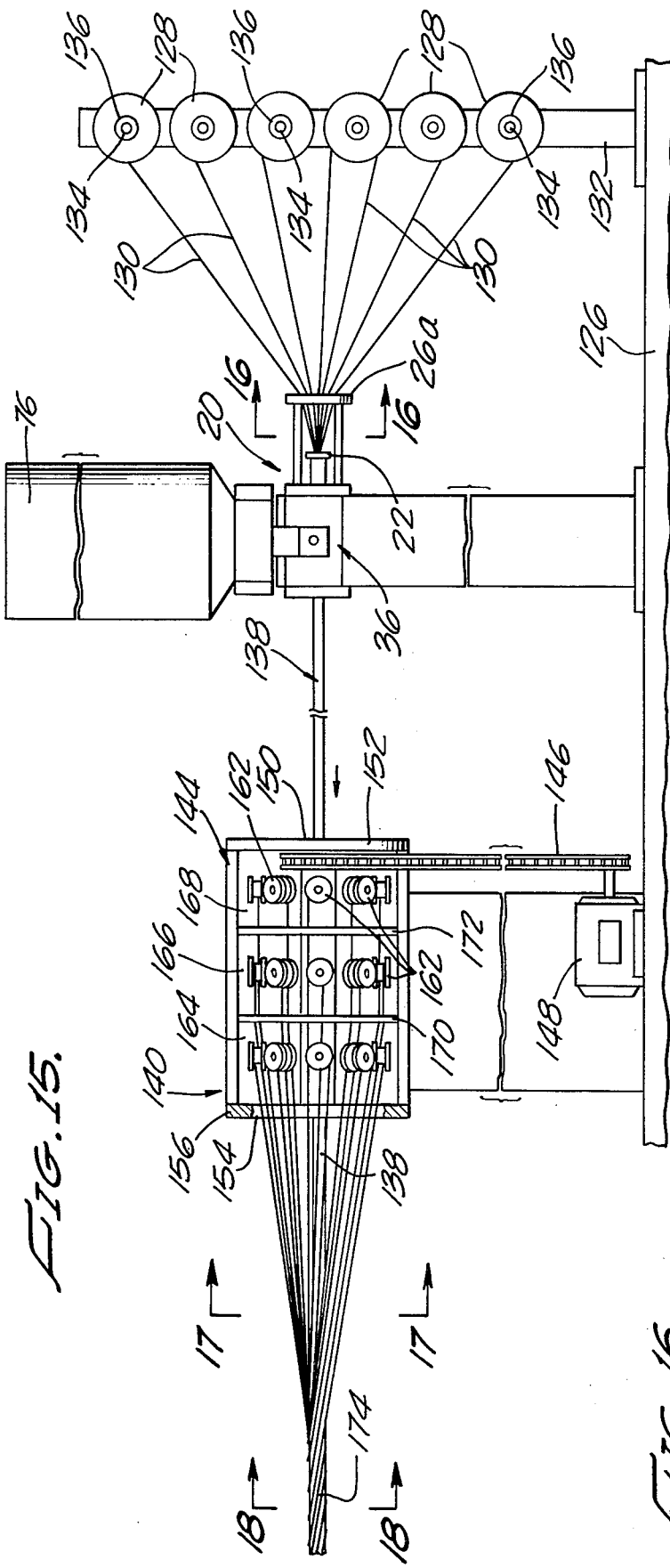

METHOD FOR FORMING A SHEATHED ELECTRICAL CABLE

RELATED APPLICATIONS

Our copending application Ser. No. 497,872, filed Aug. 16, 1974 and now abandoned, and our application Ser. No. 524,665 filed concurrently with this application, disclose cable constructions which may be manufactured utilizing the method and apparatus of the present invention.

BACKGROUND OF THE INVENTION

The present invention relates generally to the forming of an electromechanical cable and more particularly to a method and manufacture for forming an improved electromechanical cable of the type producing an antitorsional effect when subjected to flexion and tensile stresses such as are encountered during wind-up and deployment operations of the cable.

Conventionally, electromechanical cables employ one or more inner electrical conductors which may be individually insulated and are formed into a cable core by covering the conductors with a dielectric, e.g., an extruded plastic material. As is typical of this type of cable, the insulated core is provided with an outer armor for withstanding the flexion and tensile stresses, the armor being constituted by a rigid metallic tubular member enclosing the core or by a layer or layers of armor tapes wrapped spirally or helically around the dielectric of the core.

According to a known method, an armored cable of the kind under discussion, is formed by continuously moving a pair of flexible tape-shaped metallic armor members into contact with a continuously advanced cable core. Prior to engaging the cable core, the tape-shaped armor members are initially fed through a pair of forming dies and are performed into two identical concave-convex halves, each of which is substantially subjected to a crimping process in a crimping die. The cable core, in this instance, is composed of a plurality of disc-shaped insulating members spaced axially of the inner, electrically-conductive core members, the latter being individually insulated. The two armor halves are retained in position on the cable core by spirally wrapping layers of tarred insulating tape around the periphery of the armor members.

Another known electromechanical cable utilizes a cable core composed of the usual conductors covered with a foamed cellular polyolefin dielectric or a synthetic thermo-plastic insulating material. Helically wound yarns of a suitable jute are provided over the cable core and which, in turn, are covered with a metallic armoring of galvanized steel wires wound helically to hold the wires together and to ensure flexibility of the cable. To complete this cable structure, a covering of tarred insulating material is applied over the metallic wires.

When the layer of steel wires helically wound over the cable core, is subjected to substantial tensile stresses along the axis of the cable, a torque may result which causes rotation about the cable axis of all those transverse sections of the cable which are not linked.

Moreover, during laying or wind-up operations or suspension of the cable from an overhead structure to a lower structure in which condition the cable is alternately subjected to stretching and oscillating motions, temporary and unavoidable decrease in the longitudinal stress on the cable frequently results in warping and knotting of the cable which may eventually impart permanent electrical and/or mechanical damage thereto.

Furthermore, as a result of the rather rigid armor structures of typical, conventional cables and their generally inherent high mechanical resistance as regards flexibility, these prior art cable constructions are, on the whole, unsatisfactory as regards withstanding both flexion and tensile stresses, which are frequently very high, and which occur both during deployment and wind-up operations, the former involving, for example, deployment of the cable along a generally straight path parallel with the main axis of the roll from which the cable is fed.

Many attempts have been made to eliminate the above disadvantages by providing a highly flexible reinforced thermoplastic body incorporating embedded steel armoring strands and disposed or extruded around the cable core. So far, however, these attempts have failed to provide a practical solution by means of which the torsional reaction of the armoring is eliminated when the cable is subjected to flexion and tensile stresses encountered primarily during deployment operations.

Similarly, proposed reinforced structures which involved open weave or braided reinforcing cloth, or the like, laminated between sheets or layers of thermoplastics, or the like, failed to provide the desired result.

SUMMARY OF THE INVENTION

To overcome the disadvantages discussed above, the invention contemplates utilizing to an advantage the principle that thermoplastics or other formable materials may be extruded into a continuous tubular body. An extruded thermoplastic coating or covering of such configuration may be disposed over a cable core which may be composed of an electrically conductive core or armoring wire, and a sufficient, resilient securement between the coating or covering and the exposed surface of the core results from such extrusion.

Accordingly, the invention, in essence, provides for an electromechanical cable of the type comprising a cable core composed of a single or a plurality of electrical conductors, with or without individual insulation; a plurality of strain members in the form of wires, fibers or strands, arranged annularly and uniformly spaced about the cable core; and a coating or jacket of formable, flexible material which encloses the strain members.

In an alternative embodiment of the invention, the strain members constitute the cable core, surrounded by at least one electrical conductor and a layer of insulating material disposed around the core and sandwiched between the latter and the electrical conductor.

In performing the first embodiment of the invention, the strain members and cable core are continuously fed into the system from individual pay-offs. The cable core passes from the pay-off along a straight path into the crosshead of an extruder device. The strain members pass from a plurality of discrete, annularly disposed pay-offs and advance along a converging path via a guider arrangement to the closing die of the crosshead where they are drawn into engagement with the outer periphery of the cable core. The strain members are uniformly spaced about the core and extend longitudinally relative to the main axis thereof. Within the crosshead, the cable core and strain members are guided by a core tube and advanced therethrough towards an extruder die formed in the crosshead where extrusion coating of a thermoplastic jacket is applied. A vacuum is created between the coating and the strain members which quickly and tightly draws the tubular plastic coating onto the strain members. As the finished coated cable exits the die, it passes through an air gap and thence into a quench trough. Water circulated through the trough accelerates cooling of the cable as it travels the length of the trough. Finally, the cooled cable passes through a tractor capstan which supplies motive power to the system and is then fed into a wind-up unit where the finished product is wound on reels for storage or subsequent deployment.

In performing the second embodiment of the invention, the strain members are continuously fed into the system from individual pay-offs. The strain members which are to constitute the cable core, pass from the pay-off along a convergent path into the crosshead of the extruder device by way of the guide plate and closing die, at which latter position the strain members are drawn into engagement with each other. The strain members are drawn longitudinally through the extruder and are provided therein with a cover or jacket of suitable protective and insulating material. Following extrusion of the jacket about the strain members, the latter are advanced through a cable machine which serves to provide at least one electrical conductor about the outer periphery of the cover or jacket surrounding the strain members. Finally, a wrapping or cover may be provided to maintain the at least one electrical conductor in place with respect to the jacket or cover.

In each embodiment of the invention the parallel strain members are left free to shift their positions within the cable structure relative to its longitudinal axis; and the coating or jacketing material is therefore selected in conjunction with the strain member material such that the strain members are secured inside the cable, but are not bonded in fixed positions.

The method and apparatus of the present invention are particularly adapted for manufacturing the types of cable disclosed in our concurrently filed application Ser. No. 524,665 entitled—ELECTROMECHANICAL CABLE DEPLOYABLE IN A NO-TORQUE CONDITION, AND METHOD—and assigned to the same assignee as the present invention. A cable of this type was also disclosed in our copending application Ser. No. 497,872 filed Aug. 16, 1974, entitled COILED ELECTROMECHANICAL CABLE and assigned to the same assignee as the present application, and now abandoned.

Such an electromechanical cable constructed in accordance with the invention, eliminates any torsional effect when subjected to flexion and tensile stresses encountered, especially during deployment of the cable.

DRAWING SUMMARY

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a side elevational view of the apparatus embodying the present invention;

FIG. 2 is a top plan view of the apparatus shown in FIG. 1;

FIG. 3 is an enlarged fragmentary side view of the extruder crosshead and guide plate of the apparatus shown in FIG. 1;

FIG. 4 is a vertical sectional view taken substantially along the line 4—4 of FIG. 3 in the direction of the arrows showing the arrangement of the guide plate;

FIG. 5 is a vertical sectional view taken substantially along the line 5—5 of FIG. 4 in the direction of the arrows;

FIG. 6 is a cross-sectional view taken substantially along the line 6—6 of FIG. 3 in the direction of the arrows, illustrating the cable core and strain members being drawn into the extruder crosshead;

FIG. 7 is a vertical sectional view taken substantially along the line 7—7 of FIG. 6 in the direction of the arrows, illustrating a fragmentary end portion of the extruder crosshead and a cable portion comprised of a cable core and strain members in the form of metallic wires;

FIG. 8 is an enlarged fragmentary, longitudinal, vertical sectional view taken substantially along the line 8—8 of FIG. 3 in the direction of the arrows, illustrating the extruder crosshead and extruder die section incorporated in the crosshead, and illustrating, in part, the completed cable manufactured with the apparatus shown in FIG. 1;

FIG. 15 is a side elevational view of an alternate form of the apparatus embodying the present invention;

FIG. 16 is a cross-sectional view taken substantially along the line 16—16 of FIG. 15 in the direction of the arrows;

FIG. 17 is a cross-sectional view taken substantially along the line 17—17 of FIG. 15 in the direction of the arrows; and FIG. 18 is a cross-sectional view taken substantially along the line 18—18 of FIG. 15 in the direction of the arrows, illustrating the completed cable constructed with the apparatus shown in FIG. 15.

PREFERRED EMBODIMENT

Figure 9:
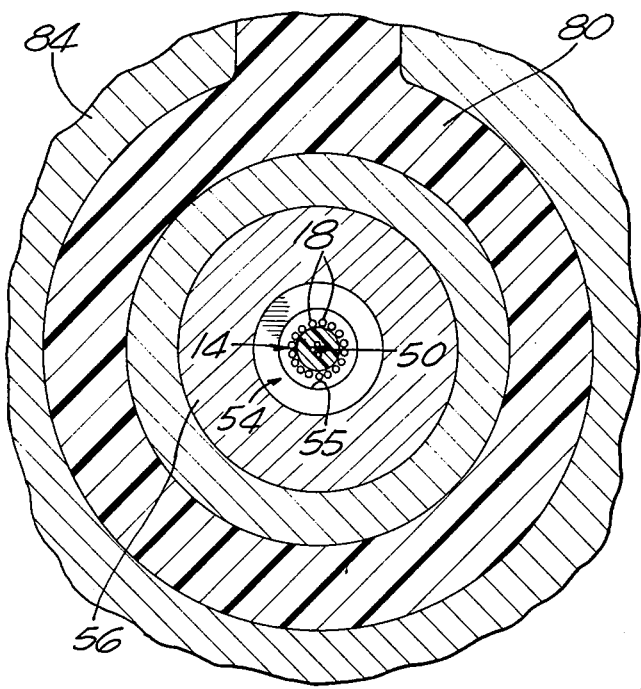
FIG. 9 is a vertical sectional view taken substantially along the line 9—9 of FIG. 8 in the direction of the arrows within the interior of the extruder die section.

Referring now to the drawings in which like reference numerals index like parts and with attention initially directed to FIGS. 1 and 2, there is shown the apparatus for forming the plastic-sheathed electrical cable according to the invention.

A suitable base 10 supports the various parts of the apparatus including a rotatable cable drum 12 having wound thereon a supply of cable core 14, a plurality of reels 16, on each of which there is wound a supply of strain members 18, and a guide assembly 20 which guides the strain members 18 and the cable core 14 fed into the system from the reels 16 and drum 12, respectively.

The cable core 14 advances continuously along a generally straight trajectory from the drum 12 to the closing die 22 by way of a conventional, adjustable tension unit such as the one shown at 24, and the guide plate 26 of the guide assembly 20. As will be appreciated, the tension unit 24 serves to maintain constant, uniform tension on the core 14 and prevents snarling or slackening thereof at any time. Furthermore, in this instance, the unit 24 simultaneously serves as a guide roller for the cable core. The reels 16 as shown in FIGS. 1 and 2, are disposed in "stacked" fashion, one above the other. The reels are rotatably mounted on a support post 28 about an axis defined by the pivots 30. Also positioned on the pivots 30 and laterally engaging the reels 16, are adjustable compression-type tension springs 32 which are adapted to suitably adjust and maintain a constant, uniform tension on the strain members 18 and prevent snarling and slackening of these members.

The reels 16 may be positioned at different angles relative to the guide plate 26 as, for example, at 16a, FIG. 2, or may extend substantially normal to the plate 26 as at 16b, FIG. 2. Suitable guide rollers 34 are provided, past which the strain members 18 are directed to the guide plate 26.

The given positions of the reels 16, in association with the position of the guide rollers 34 relative to the guide plate 26, and the given pattern of the guide holes 44, FIG. 4, in the guide plate 26, determine the angle at which the strain members 18 are fed to the guide plate.

The guide assembly 20 is seen to comprise the guide plate 26 shown in detail in FIG. 4, and which is secured to the extruder crosshead 36, FIG. 3, by means of a pair of spaced, rod-shaped plate support members 38. A pair of guide sleeves 40, FIGS. 3 and 5, carried by the guide plate 26 at opposite sides thereof, secure the guide plate to the support members 38.

As shown, the guide sleeves 40 are provided with screw members 42 to secure the sleeves in position against the support members 38.

The guide plate 26 as shown in detail in FIGS. 4 and 5, is relatively thin and of generally annular configuration and defines a plurality of holes 44 disposed in a substantially circular pattern adjacent the inner periphery or central hole 46 of the plate. The holes 44 extend equidistant, radially outwardly from the center axis A of the plate and are evenly spaced relative to each other to thereby provide uniform spacing of the strain members 18 around the cable core 14.

The cable core 14 and strain members 18 fed through the guide plate 26, are presently advanced to the closing die 22, the die being of generally tubular configuration and having a desired, predetermined inner diameter 48, FIG. 6. The diameter, preferably, corresponds generally to the overall diameter of the cable structure including the strain members and the cable core which, in essence, is composed of a single or a plurality of conductors, with or without individual insulation, and surrounded by a cylindrical body of dielectric thermoplastic material. The closing die 22 serves to constrict the bundle of advancing strain members 18 and bring these members into direct engagement with the cable core 14.

As a result of the uniform, annular spacing of the holes 44 in the guide plate 26 and the given inner diameter 48 of the closing die 22, the strain members 18, upon being drawn from the guide plate 26 into the closing die, will automatically be disposed uniformly around the central cable core 14, FIG. 6, and in parallelism with the longitudinal axis of the core, FIG. 7.

As shown in FIG. 6, the strain members 18 are uniformly disposed around the cable core 14, however, in the preferred embodiment of the invention, at least some of the strain members are arranged about the core with a circumferential spacing of about 1% – 5% of the diameter of an individual strain member between them. This, as will be shown hereinafter, permits the plastic material to be extruded about the strain members and, to a degree, between the members, without reaching the outer periphery of the cable core.

In the embodiment under discussion, the strain members utilized are in the form of discrete metallic wires while the cable core, as clearly shown in FIGS. 6 and 7, is comprised of the generally helically wound electrical conductors 50 and the layer of thermoplastic insulating material 52 enclosing the conductors.

The cable elements compressed in the closing die 22, are routed through the extruder crosshead 36 to the extruder die 54 via a cable guide tube 56, the extruder die being threadably positioned in the housing, axially opposite the closing die 22. As best seen in FIG. 8, the extruder die 54 defines a recessed interior 55 including a tapered section 58 terminating into an opening 60. The cable guide tube or core tube 56 extends concentrically within a hollow passage 62 defined within the extruder crosshead 36.

The tube 56 terminates adjacent the rear side 64 of the extruder die 54. Coating in the extruder die usually requires a vacuum to be drawn between the coating and the cable. The vacuum quickly and tightly draws the coating onto the cable, i.e., in this instance, onto the strain members 18. In the present case, the vacuum is drawn through the guide tip 66 and through a nipple 68, FIG. 3, attached to the core tube 56. The rear of the core tube where the cable element enters is provided with a gasket 67, FIG. 3, such that large amounts of air are not drawn into the vacuum line 70. As the name implies, the guide tip 66 serves to center the cable elements in the tubing die 54. A second function of the guide tip is to prevent plastic melt from exiting at the rear of the crosshead. The dies are interchangeable and, hence, the land length of all dies and guides are the same. The front or tip of the guide should be flat with the edges rounded slightly ~ 1/16 inch radius. The tip should protrude about 1/16 inch from the end of the die. The inner diameter of the hole 72 through which the cable passes should be at least 10 mils larger than the wire so that adequate vacuum can be applied.

A flow splitter 74 is used just on the downstream side of the throat section of the crosshead 36 where the direction of flow of molten plastic from the hopper 76 is changed about 90°. Also, the flow splitter causes the flow of the molten plastic to split via a passage 78 into two equal streams 180° apart.

Figure 10:
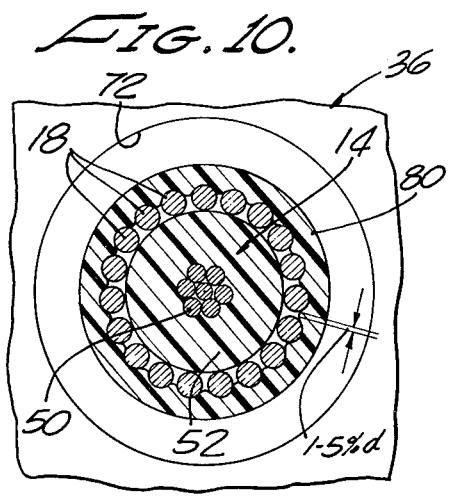
FIG. 10 is a vertical cross-sectional view taken substantially along the line 10—10 of FIG. 8 in the direction of the arrows, showing the completed cable upon leaving the extruder die.
Figure 12:
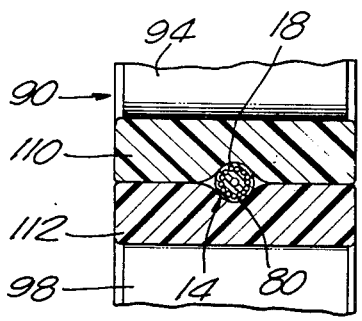
FIG. 12 is a sectional view taken substantially along the line 12—12 of FIG. 11 in the direction of the arrows, showing the cable being frictionally gripped by the tractor capstan.
Figure 11:
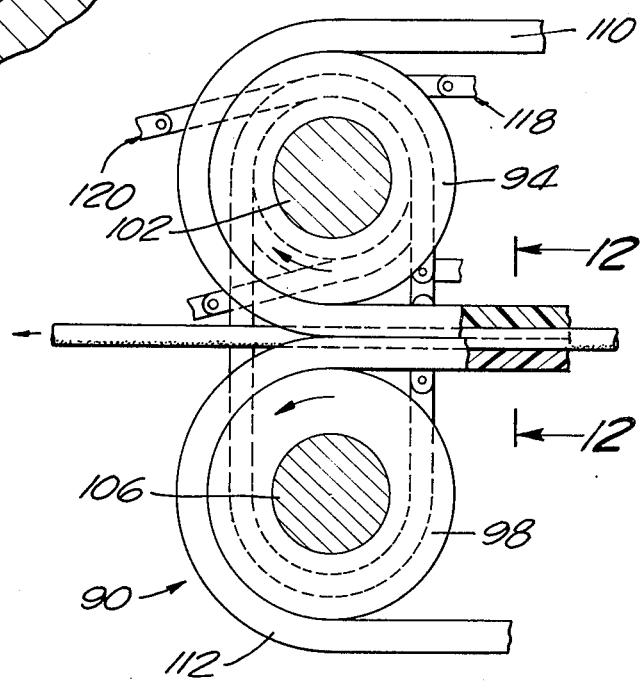
FIG. 11 is an enlarged fragmentary, longitudinal, vertical sectional view taken substantially along the line 11—11 of FIG. 2 in the direction of the arrows, illustrating a portion of the tractor capstan.

The extruder die 54 receives the plastic melt under pressure from the extruder and once the cable structure is being drawn through the extruder die, FIG. 9, and past the opening 60, FIG. 10, a uniform coating or layer of molten plastic material 80 is applied around and partly between the strain members 18 via a channel 82 defined between the wedge ring 84, FIG. 8, and the inclined surface 58 of the tapered die end. The lateral, minute spacings between the discrete wires 18 is such that, on the whole, molten plastic is prevented from reaching the actual cable core. Upon extruding the plastic coating onto the cable structure, the cable is fed to the cooling assembly 86 for cooling of the plastic in a water containing trough 83, FIG. 1, through which the completed cable is journalled.

Following coating the plastic material around the cable structure in the extruder die and subsequent cooling treatment of the coated cable in the cooling assembly 86 to complete the cooling and solidification process of the outer plastic jacket or armor 80, the cable passes through a tractor capstan 90 shown in FIGS. 1, 2, 11, and 12, and which supplies the motive power to pull the cable through the system and advance the cable to a wind-up in the form of a takeup reel 92.

The tractor unit shown, is seen to comprise two pairs of driven rollers 94, 96 and 98, 100 rotatable about shafts 102, 104 and 106, 108. Each pair of rollers is interconnected by a continuous belt 110, 112, respectively. The outer peripheries of the roller elements each engage the inner belt surfaces and are arranged such that the outer belt surfaces frictionally engage each other. The amount of frictional grip at the position 114 can be adjusted by varying the tension of the belt surfaces relative to each other. Adjustment is accomplished by means of a friction control unit 116 linked to the tractor shafts. The rollers 94, 96, as shown, are arranged to drive the belt 110 in clockwise direction while the rollers 98, 100 are arranged to drive the belt 112 in counterclockwise direction. Generally, this type of tractor unit is operated at speeds below 1000 fpm.

The tractor capstan 90 is operated by an electric motor 114, FIG. 2, which, via a drive shaft 116 and a gear network 118, is coupled to the shafts 102, 104 to rotate the latter. Since the cable speed is controlled by the tractor capstan, a uniform and vibration free pull is essential. Any fluctuation in pulling rate will cause coating diameter variations.

The wind-up unit in the form of takeup reel 92, is the collection point for the finished cable and at which point the cable is twisted 360° for each complete revolution. The wind-up unit 92 is driven by a gear network 120 via the shaft 102 and a gearing wheel 122 interconnected with the shaft 124 which rotates the reel 92. The respective gear assemblies are formed into a slip-clutch arrangement to keep pace with the speed of the tractor unit to insure a tight and uniform wind-up on the reel.

Figure 13:
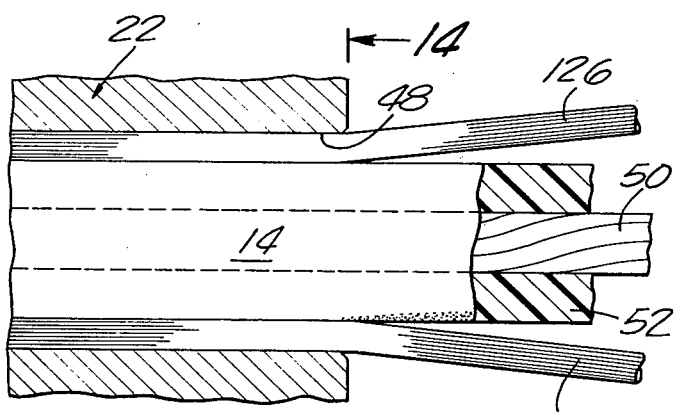
FIG. 13 is a view similar to FIG. 7, however, illustrating a cable portion comprised of a cable core and strain members in the form of fibers positioned around the cable core.
Figure 14:
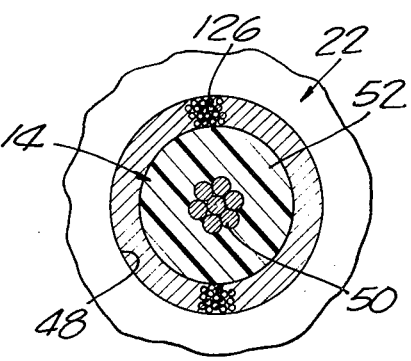
FIG. 14 is a view similar to FIG. 6, taken substantially along the line 14—14 of FIG. 13.

FIGS. 13 and 14 show a modification of the strain members which in the embodiments shown therein are in the form of a rigid bundle of fibers or strands 126 made, for example, of bundles of mono-filaments of aramid, polyurethane, nylon or glass having a substantially high tensile strength.

For paying out the fibers, the same reels as the reels 16 are used with the exception that where otherwise a single metallic wire is payed out, a bundle of fibers or filaments is payed-off from each reel. Usually, the fibers or strands are bundled into cords and the diameter of the accumulation of fibers is 17 mils. Upon being drawn into the closing die via the guide plate 26, the bundles of fibers tend to merge with each other. A single annular or cylindrical arrangement of the fiber bundles is thereby attained. Hence, the fiber bundles or cords rearrange themselves geometrically about the cable core 14 during their journey through the system.

From the above, it will be appreciated that the feeding rate of the drum 12 and the reels 16 depend on the speed of the tractor unit 90. It should be noted, however, that the speed of feeding the strain members if synchronized with the movement of the cable core.

From the foregoing, it will further be appreciated that the circumferential spacing between the adjacent armor elements enable these elements to be shifted relative to each other during twisting and untwisting of the cable, e.g., during storage and deployment operations. The degree of shifting of the individual wires, or course, depends upon the extent of flexion and tensile stresses exerted on the cable during such operation. Moreover, during deployment of the cable following, the spacings between the wires enable the initially biased armor elements to regain their original position relative to the core without concurrent antitorsional reaction of the cable; which, for example, enables deployment of the cable in a direction parallel to the main axis of a drum upon which the cable has been wound.

Shown in FIG. 15 is an alternate apparatus constructed in accordance with the invention and which enables the manufacture of a cable of the type hereinbefore discussed, however, in which the strain or armor elements make up the core of the cable and in which at least one electrical conductive element is disposed exteriorly of the jacket or sheath which surrounds the inner strain members.

A suitable base 126 supports the various parts of the apparatus including a plurality of reels 128 on each of which there is wound a supply of strain members 130, made of a material of high tensile strength such as, for example, bundles of monofilaments of aramid, asbestos, glass, poly-urethane, nylon, or similar material having the required tensile strength.

The reels 128 are rotatably mounted on a support post 132 about an axis defined by pivots 134. Also positioned on the pivots 134 and laterally engaging the reels 128, are adjustable compression-type tension springs 136 which are adapted to suitably adjust and maintain a constant, uniform tension on the strain members 130 and prevent snarling and slackening of those members.

The strain members 130 are directed from the reels 128 to the guide assembly 20 which, as regards its operation, is similar to the guide assembly described with respect to the embodiment of FIG. 1.

The guide plate 26a shown in detail in FIG. 16, and which as in the embodiment of FIG. 1, is secured to the extruder crosshead 36, is provided with a plurality of openings or passages 136, FIG. 16, through which the strain members 130 are journalled towards the crosshead 36. In the embodiment shown, the guide plate 26a is provided with six passages equalling the number of strain members fed from the reels 128.

It will be appreciated, however, that the invention is not limited to a guide plate having six apertures but that depending on a given application, a guide plate may be utilized which is provided with either a lesser or greater number of passages 136.

Upon drawing the strain members 130 together in the crosshead 36 by the closing die 22 as discussed hereinbefore, the strain members are provided with a jacket of suitable material such as a thermoplastic material.

Extrusion of the jacket, as before, takes place in the extrusion section of the crosshead.

From the extruder, the jacketed members 138 are advanced to the cable machine 140 and are guided therethrough by conventional guide means, not shown.

The cable machine 140 is seen to comprise an outer housing 142, FIG. 17, having enclosed therein a revolving cage 144, which by means of a chain and sprocket drive 146, is arranged to be rotated in either clock or counterclockwise direction.

A speed-adjustable motor 148 is provided to actuate the drive 146.

At the input end 150 of the machine 140 is a generally disc-shaped plate 152 in which the jacketed strain members 138 enter the cage 144 while at the output end 154 of the machine a disc-shaped plate 156 is provided having a plurality of apertures 158, FIG. 17, extending therethrough. The apertures 158 enable the exit of the jacketed strain members 138 and a supply of electrical conductor elements 160, FIG. 17, which are fed from a plurality of bobbins 162 conventionally rotatably supported on pivot members, not shown, secured to the usual cradles, not shown, positioned within the cage 144.

As shown in FIG. 15, the cage 144, in this instance, is subdivided into three compartments 164, 166, 168. The three compartments are defined by the outer disc-shaped plates 152, 156 and intermediate disc-shaped plates 170, 172. The compartments provide easy access to the bobbins 162 so as to enable replacement of empty spools or bobbins.

During clock or counterclockwise rotations of the cage 144, the electrical conductors 160 are drawn from the bobbins 162 under actuation of the jacketed strain members 138 to which the free ends of the conductor elements are attached and around which they are to be wrapped.

If desired the finished cable 174, FIG. 15, may be provided with an outer wrapping or sheath 176, FIG. 18, to maintain the electrical conductors in position relative to the jacket surrounding the strain members.

A pulling tractor and take-up reel similar to the ones shown in the apparatus of FIG. 1 provide the necessary motive force to pull the cable through the system and provide the means for storage of the finished cable.

The invention has been described in considerable detail in order to comply with the patent laws by providing a full public disclosure of at least two of its embodiments. However, such detailed description is not intended in any way to limit the broad features or principles of the invention, or the scope of patent monopoly to be granted.

What is claimed is:

1. A method of manufacturing a sheathed electromechanical cable for submarine use which includes the steps of:
    feeding along a predetermined path an electrically conducting cable core covered by a hardened plastic insulating material and having a circular cross-section,
    feeding a plurality of annularly disposed discrete flexible strain members along a converging course directed toward said predetermined path of said core,
    drawing said strain members into close contact with said cable core with the individual members extending parallel to one another and to the longitudinal axis of said cable core and disposed about the core with a circumferential spacing,
    simultaneously advancing said cable core and strain members along said predetermined path, and
    continuously lengthwise extruding a molten thermoplastic material about the cable core and strain members as they simultaneously advance along said predetermined path to thereby provide a tubular sheath whose inner surface is brought into close contact with the outer surfaces of the strain members but is not forced to fill the circumferential spaces between the strain members, thereby providing a cable in which the strain members are free to physically reorient themselves helically about the axis of the cable when the latter is twisted.

2. The method as claimed in claim 1 further comprising the step of applying vacuum for drawing the thermoplastic material during extrusion thereof into contact with the outer surfaces only of the strain members.

3. The method as claimed in claim 1 wherein said flexible strain members are in the form of metallic wires.

4. The method as claimed in claim 1 wherein said flexible strain members are in the form of bundles of synthetic mono-filaments.

5. A method of manufacturing a sheathed electromechanical cable for submarine use which includes the steps of:
    feeding along a predetermined path an electrically conducting cable core covered by a hardened plastic insulating material and having a circular cross-section
    feeding a plurality of annularly disposed discrete support elements along a converging course directed towards the predetermined path of said cable core,
    drawing said support elements into close contact with said cable core with the individual elements extending parallel to one another and to the longitudinal axis of said cable core and disposed about the core with a circumferential spacing,
    simultaneously advancing said cable core and support elements along said predetermined path, and
    continuously lengthwise extruding a molten plastic material about said cable core and support elements as they simultaneously advance along said predetermined path to thereby form a tubular sheath which has a non-bonding engagement with the outer surfaces of said support elements, the circumferential spacing of the support elements about the core being small enough such that during the extruding step the molten plastic material is prevented from reaching the cable core while being large enough to facilitate the shifting of the support elements relative to each other and to the axis of the cable when the latter is twisted during use thereof.

6. The method in accordance with claim 5 wherein said support elements are disposed about the core with a circumferential spacing of 1% to 5% of the diameter of the individual support elements.

7. In the manufacture of a sheathed electromechanical cable having antitorsional characteristics, the method comprising:
    feeding continuously along a predetermined path a cable core containing at least one conductor, said core being covered by a hardened insulating material having a circular cross-section feeding continuously a plurality of annularly disposed individual load-bearing strands each composed of an accumulation of discrete fibers have a high tensile strength along a converging course directed towards said predetermined path of said core, constricting said plurality of individual load-bearing strands such that said strands merge with each other in close circumferential contact with said core with the individual fibers extending parallel to one another and to the longitudinal axis of said cable core, simultaneously advancing said cable core and said load-bearing strands along said predetermined path, continuously lengthwise extruding a tubular coating of flexible sheath-forming material whose inner surface contacts the outermost fibers only of said load-bearing strands without bonding thereto and forms with the outer surface of the cable core an annular cavity in which the discrete fibers of individual strands are loosely disposed when the sheath-forming material hardens.

* * * * *